(12) United States Patent
Davies

(10) Patent No.: US 6,205,963 B1
(45) Date of Patent: Mar. 27, 2001

(54) HIGH POWER DENSITY, LOW EMISSION INTERNAL COMBUSTION ENGINE

(76) Inventor: Jim W Davies, 49-2800 Allwood St., Clearbrook, B.C. (CA), V2T3R9

(*) Notice: Subject to any disclaimer, the term of this patent is extended or adjusted under 35 U.S.C. 154(b) by 0 days.

(21) Appl. No.: 09/287,385

(22) Filed: Apr. 6, 1999

(51) Int. Cl.$^7$ ........................................ F01L 1/28

(52) U.S. Cl. ................... 123/79 A; 123/190.12

(58) Field of Search ............... 123/79 A, 190.12, 123/64

(56) References Cited

U.S. PATENT DOCUMENTS

| | | | | |
|---|---|---|---|---|
| 1,439,894 | * | 12/1922 | Howard | 123/190.12 |
| 2,401,932 | * | 1/1946 | heintz | 123/190.12 |
| 3,071,213 | * | 1/1963 | Gromme | 123/79 A |
| 3,948,241 | * | 4/1976 | Melchior | 123/190.12 |
| 4,674,450 | * | 6/1987 | Krajancich | 123/79 A |
| 4,827,882 | * | 5/1989 | Paul et al. | 123/79 A |
| 5,315,963 | * | 5/1994 | Warf | 123/190.12 |

* cited by examiner

Primary Examiner—Tony M. Argenbright
Assistant Examiner—Jason Benton

(57) ABSTRACT

An improved internal combustion piston engine that utilizes, in combination at least one poppet valve 52 of known type and a sleeve valve 5 to affect the functions of intake and exhaust gas flow. The resulting gross increase in valve area and volumetric efficiency enables the engine to produce high specific power without large valve opening durations or valve overlap and the resultant undesirable increase in low speed pollution and torque reduction.

One embodiment of this invention will use the at least one poppet valve 52 as an intake valve, and the sleeve valve 5 as an exhaust valve. Another embodiment of this invention will use the at least one poppet valve 52 as an exhaust valve, with the sleeve valve 5 performing the intake valve function.

Additionally, the sleeve valve may be either constantly or intermittently or incrementally moved to open or close a port through described methods. Intermittent movement of the sleeve valve may be controlled by a computer 77 in known manner, a novel advantage being that a relatively small amount of energy is required for this function because the sleeve is largely moved by friction with the piston 46 or associated parts 47, 48, 49.

Another novel feature is the use of engine oil instead of a water based coolant to control heat in the cylinder sleeve area 10. This minimizes friction and significantly simplifies cylinder block design and manufacture.

The use of poppet valves which are either intake or exhaust valves simplifies cylinder head design, and the elimination of cold and hot valve and port areas in the confined space of a cylinder head reduces the complexity of design for use of ceramic materials.

21 Claims, 11 Drawing Sheets

HIGH POWER DENSITY, LOW EMISSION INTERNAL COMBUSTION ENGINE

BACKGROUND

1. Field of Invention

This invention relates to internal combustion engines and more specifically to engines of increased volumetric efficiency, simplified construction and reduced emissions.

2. Prior Art

Presently, automotive and other internal combustion engine design is being influenced by average fuel economy legislation, emission control legislation or both. These complex and often contradictory initiatives have forced manufacturers to mass produce more sophisticated internal combustion engines. This has driven up the cost of manufacture and increased complexity.

An important part in current engine development is played by the computer. Embedded controllers and their sensors and controlled outputs allow a complexity of engine management not possible in other known manner. An important developmental field of engine management related to emissions and power output is variable valve timing. That is, a computer, reacting to sensor input and a prepared software program directly controls opening and closing of an engine valve. This allows the opening amount [lift] and the opening time [duration] as well as the relationship between these events [centerline and overlap] for each valve to be controlled individually and variably. It also becomes possible to selectively not open a valve at all; for example, to assist vehicle braking or reduce part throttle pumping losses by using less than the maximum number of engine cylinders at a given moment.

While the advantages of computer engine management in general and computer management of engine valves in particular are well known in the art it has not been possible to date to conceive and manufacture a working, reliable and simple poppet valve controller. This is essentially because the electrical or other power requirements to do this work are relatively large and become even larger as engine crankshaft speed increases. Another problem is the impact loads developed, especially during valve closing. This problem also worsens as engine speed increases. While a poppet valve must rapidly accelerate to a high speed at the beginning of travel, it must complete this travel at a relatively low speed if the valve and its engine are to have a suitably long life and low noise and vibration.

The use of sleeve valves in piston engines of all types is well known in the art. Double and then later single sleeve valves were widely used in the 1920 to 1940s era in automotive, heavy duty gasoline, diesel and aircraft piston engines. Design improvements culminated in several high performance military air and liquid cooled aircraft powerplants used in the world war two period. Developers and Manufacturers included, for example Pratt and Whitney, Continental Engines, Napiers, Bristol Aircraft and Rolls-Royce.

These engines used a single sleeve valve in combination with a re-entrant or junk head. This type of head and sleeve combination utilizes sealing rings in the cylinder head and upper sleeve area. Intake and exhaust ports are pierced through the sleeve walls and depend on both reciprocation and partial rotation of the sleeve for timed alignment with appropriate port openings in the engine cylinder block to accomplish intake and exhaust processes. Although both high specific power outputs and long service life were achieved with various makes and models of these engines the rapid development of gas turbine aircraft engines in 1945 and later signaled the end of high output aircraft piston engine development in the world. Also eclipsed by the development of aircraft gas turbines was the later, simplified and superior sleeve development developed by Harry Ricardo. This sleeve differed from the above described junk head, pierced sleeve design by being a simple cylindrical shape with sealing accomplished by heat expansion of the sleeve periphery to the cylinder head. Because this sleeve is not pierced for exhaust ports, but simply allows this function to be performed over the top edge of the cylindrical sleeve, engine operation is greatly simplified at the same time as the effective valve area is greatly increased.

This sleeve valve design is described in U.S. Pat. No. 2,318,333 and also in a book by Harry Ricardo, "The High Speed Internal Combustion Engine" 4th edition and 5th edition.

Said book describes a later, improved version of the sleeve design detailed in U.S. Pat. No. 2,318,833 and gives a fuller explanation of the sealing function. The described engine is a developmental, single cylinder version of what became a Rolls-Royce production military aircraft engine, the Crecy, also referred to as the P.I. 26 [Petrol Injection, 26 liter displacement]. This engine is briefly described in the above noted book as well as "Rolls-Royce and the Mustang" by David Birch, Rolls-Royce Heritage Trust [1987].

These engines were two-cycle, highly supercharged stratified charge direct injection gasoline engines. The single-cylinder, 100 cubic inch developmental engines ultimately produced over 350 horsepower on 100 octane fuel. The use of this sleeve design as an exhaust valve in such a highly supercharged, two-stroke engine serves to demonstrate its robust nature and ability to seal reliably under very high temperatures and speeds.

However, a limiting feature of this engine and sleeve design is that it can be used with a two-stroke engine design only. This uniflow scavenged engine had intake air forced through slots in the sleeve lower end after the descending piston uncovered said slots. This air forced exhaust gases out the open sleeve exhaust valve until either the rising piston or valve closure stopped the flow in a manner similar to some two-cycle production diesel engines.

Objects and Advantages

Accordingly, several objects and advantages of my invention are:

A primary object of this invention is to provide an internal combustion engine of high power density, simplified construction and low emissions by a gross increase in effective valve area through the unique incorporation of both a sleeve valve and a poppet valve in one cylinder.

By thus obtaining a gross increase in effective valve area, both higher volumetric efficiencies and higher power output throughout a wide speed range together with lowered emissions as a result of conservative valve timing are easily and conveniently attained.

It is another object of the present invention to provide a sleeve valve which is easily and conveniently controlled in valve opening duration and lift through simple and cost-effective means, including computer controlled means.

It is yet another object of the present invention to provide an improved efficiency, simplified internal combustion in which the lubricant is also used to effect engine cylinder cooling.

It is a further object of this invention to provide control of sleeve valve movement through various methods to improve operation of an internal combustion engine at all speed ranges.

Yet a further object is the incorporation of improvements to the mechanism to improve durability, lower complexity, increase efficiency over the entire operating range of an internal combustion engine and simplify cooling system requirements.

Still further objects and advantages will become apparent from a consideration of the ensuing description and accompanying drawings.

Figure 1:
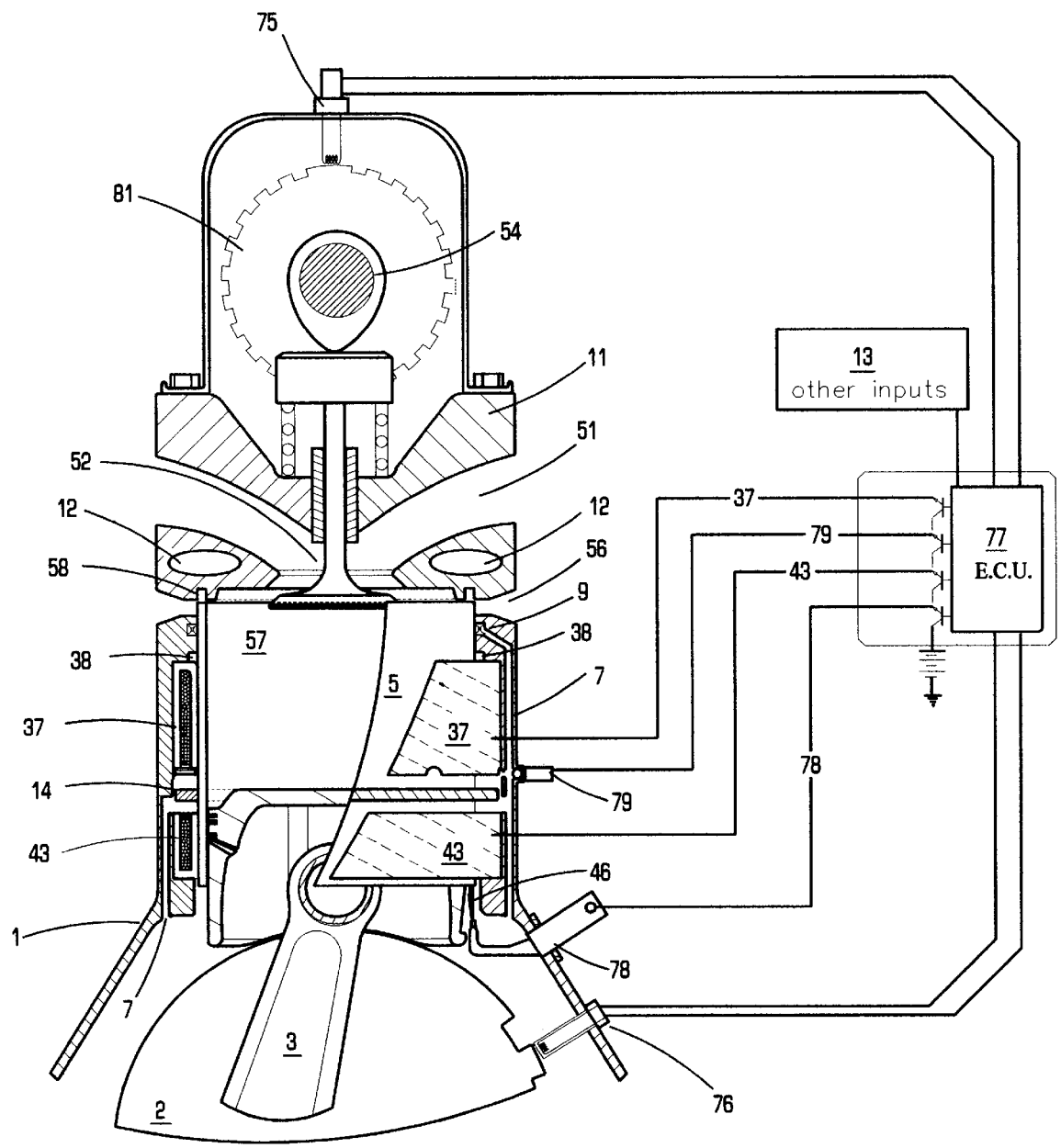
FIG. 1 is a cross sectional view taken through a single cylinder of a reciprocating internal combustion piston engine together with a pictorial depiction of a computer control system, both constructed in accordance with an embodiment of the invention.

Reference Numerals 1. engine cylinder block
2. crankshaft
3. connecting rod
4. cooling water jacket [optional]
5. cylinder sleeve
6. sleeve valve port liner assembly (intake or exhaust)
7. oil drain passage
8. sleeve seat
9. sleeve seal ring
10. cooling oil jacket
11. cylinder head
12. cylinder head coolant passage
13. other engine management inputs
14. sleeve armature
15. sleeve armature oil drain
16. toggle drive link
17. toggle drive upper link
18. toggle drive lower link
19. toggle drive stabilizing spring
20. toggle drive lower adjustable pivot
21. toggle drive control solenoid 22. toggle drive control solenoid, opening winding
23. toggle drive control solenoid, acceleration winding
24. toggle drive control solenoid, closing winding
25. sleeve latch assembly
26. sleeve latch pivot
27. sleeve lock return spring
28. sleeve lock block
29. sleeve lock spring seat
30. sleeve lock roller
31. sleeve lock roller return spring
32. sleeve lock link
33. sleeve lock assembly
35. sleeve spring
36. sleeve rocker arm
37. sleeve upper [closing] solenoid and guide
38. sleeve cooling oil supply inlet
39. sleeve cooling oil flow direction
40. sleeve cooling oil drain, lower
41. sleeve cooling oil drain upper
42. sleeve cooling oil drain, upper, control valve
43. sleeve lower [opening] solenoid and guide
44. piston
45. piston pin
46. piston skirt thrust surface
47. piston skirt insert, ferrous
48. piston ring
49. piston oil thrust reservoir
50. cylinder head
51. poppet valve port [intake or exhaust]
52. poppet valve [intake or exhaust]
53. spark plug
54. camlobe
55. manifold [intake or exhaust]
56. sleeve valve port [intake or exhaust]
57. combustion chamber
58. sleeve valve cylinder seal
59. not used
60. not used
61. not used
62. not used
63. not used
64. not used
65. not used
66. cylinder head bolt
67. cylinder head bolt spacer
68. swirl guide vane
69. swirl guide vane, minimum position
70. swirl guide vane, maximum position
71. swirl guide vane control pivot point
72. swirl guide vane control pivot ring circumference
75. camshaft position sensor
76. crankshaft position sensor
77. electronic control unit
78. piston wedgelock oil control solenoid
79. sleeve oil control accelerator solenoid
80. sleeve latch solenoid
81. camshaft sensor ring
82. crankshaft sensor ring or notch
83. sleeve latch release oil cavity
84. sleeve latch release oil drain
85. sleeve latch oil inlet
86. sleeve latch plunger/accumulator

SUMMARY OF THE INVENTION

In summary, numerous benefits result from employing the concepts of the present invention. The unique use of a sleeve valve in combination with at least one poppet valve results in an engine with a gross increase in valve area not possible with any other known valve design. This permits wide design latitude in valve opening events while maintaining high power output and low emissions.

The ability is realized to control sleeve valve operation with a computer program in a simple but effective manner because the high power requirements needed for poppet valve computer control of known type are unnecessary when the sleeve valve driving power is largely taken from the collateral movement of the reciprocating parts of the engine.

The sleeve assembly and subassemblies are of relatively simplified construction which among other advantages allows easy and convenient design for integration of ceramics into engine design, for example the cylinder head with its lack of hot and cold valve and port areas. Also disclosed are various means for moving and controlling the sleeve valve relative to movement of the crankshaft.

The mounting structure maintains low friction between the cylinder block and the sleeve. Cooling the sleeve area with lubricating oil considerably reduces engine block manufacturing complexity. Advantageously this significantly reduces material costs and eliminates sizable machining costs associated with cylinder blocks as utilized in prior art.

PREFERRED EMBODIMENT—DESCRIPTION

Referring now in detail to the drawings and initially to FIG. 1, a four-cycle, gasoline or diesel engine constructed in accordance with a main embodiment of the invention is depicted. Although the invention is described in conjunction with such an engine, it should be readily apparent to those skilled in the art that certain facets of the engine can be employed with other types of engines than those operating on a four-cycle principal, other than reciprocating engines and also engines having other cylinder numbers and types. Since it is believed that those skilled in the art can readily understand how the invention can be practiced with multiple cylinders, only a single cylinder of the engine has been depicted. Engine operation functions not hereafter described are not part of the invention and are carried out in well known manner.

The engine includes a cylinder block, indicated generally by the reference numeral 1 that is formed with at least one cylinder bore. A cylinder head assembly 11 is affixed to the cylinder block in a known manner and closes the upper end of the cylinder bores. Piston 44 is supported for reciprocation in each cylinder bore and is connected by means of connecting rod 3 to the individual throws of a crankshaft, indicated generally by the reference numeral 2. The crankshaft is rotatably supported within a crankcase formed by the skirt of the cylinder block 1 in known manner.

The internal combustion engine to be employed in this embodiment of the present invention is an engine having, in combination, at least one poppet valve 52 and at least one sleeve valve 5 for each piston and cylinder combination. Both poppet and sleeve valves directly and individually control flow into or out of the combustion chamber. The sleeve valve will preferably move in a mainly reciprocating manner. One preferred embodiment of this invention will use the at least one poppet valve 52 as an intake valve, and the sleeve valve 5 as an exhaust valve. An internal combustion engine using the at least one poppet valve as an exhaust valve, with the sleeve valve acting as an intake valve is also possible and even preferable in certain situations, as described hereafter. As even four or more poppet valves for one cylinder will not be equal in breathing ability to one sleeve valve of the current invention, any engine that needs maximum breathing capability will use the sleeve valve as an intake, with the poppet valves as exhaust, giving a similar preponderance in size to the intake as is common in the art.

The sleeve 5 will preferably be of single, open ended thin wall relatively light weight tubular construction, of suitable diameter to slide precisely yet freely within the engine block, the sleeve being of sufficient length to provide sliding support for the piston. Suitable sleeve materials include, but are not limited to steel, cast iron, silicone aluminum, titanium and ceramics. Sleeves may be either one continuous piece, sintered or constructed from two or more materials, each selected for maximum life, economy, magnetic quality and so on.

The cylinder sleeve may be tapered or otherwise adapted as necessary while the upper end of the associated cylinder head seat may be correspondingly altered as necessary, depending on material selection for either to ensure sealing through heat expansion. Heat flow to and through this area is such that satisfactory sealing is accomplished in the first few power strokes of the engine. Subsequent expansion and sealing is self regulating in that insufficient sleeve expansion, resulting in insufficient heat flow from sleeve top to cylinder insert causes an increase in sleeve temperature, resulting in sleeve expansion, etc.

The cylinder block 1 corresponding to the upper end of the sleeve valve performs the following functions: it acts as a sleeve upper guide and locator, contains and locates the sleeve oil sealing device(s) 9, to effect a fluid tight seal between the combustion chamber, the cylinder head, the engine block deck, the sleeve lubrication/cooling area 38 and the exhaust or intake area 56. It further directs, shapes and restricts, as desired, the exhaust gas or intake charge flowing from the combustion chamber under control of the sleeve valve 5.

It also serves as the area of location of the swirl guide vanes FIGS. 13 to 16. If used, guide vane 68 which may pivot on cylinder head bolts 66 and suitable pivot bushings 67 serves to direct and restrict when desired air flowing into, or exhaust gas flowing out of the cylinder of the engine. Each swirl guide vane 68 is controlled between minimum FIG. 14 and maximum FIG. 15 positions by a simple rotary pivot [not shown] attached, for instance to pivot point 71 The swirl guide vanes perform at least one of the following:

1] exhaust braking [if used with a sleeve valve exhaust]
2] turbulence generation
3] charge stratification
4] intake manifold pressure modification during part throttle engine operation.

Figure 2:
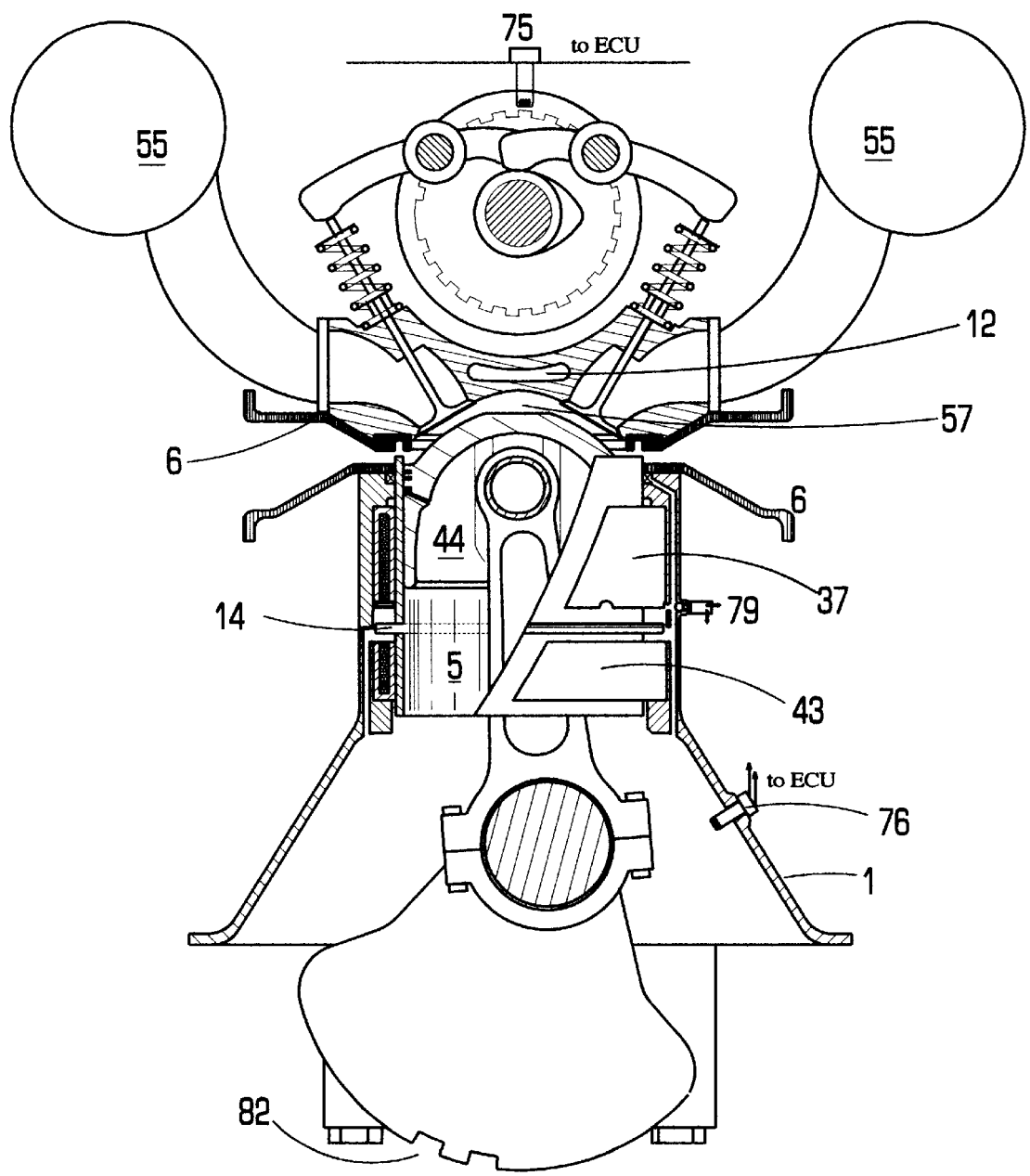
FIG. 2 is a cross sectional view taken through a single cylinder of a reciprocating internal combustion engine constructed in accordance with an embodiment of the invention showing a cylinder port liner and multiple poppet valves as well as a partially cut away sleeve valve and sleeve valve controlling solenoid/guides.
Figure 3:
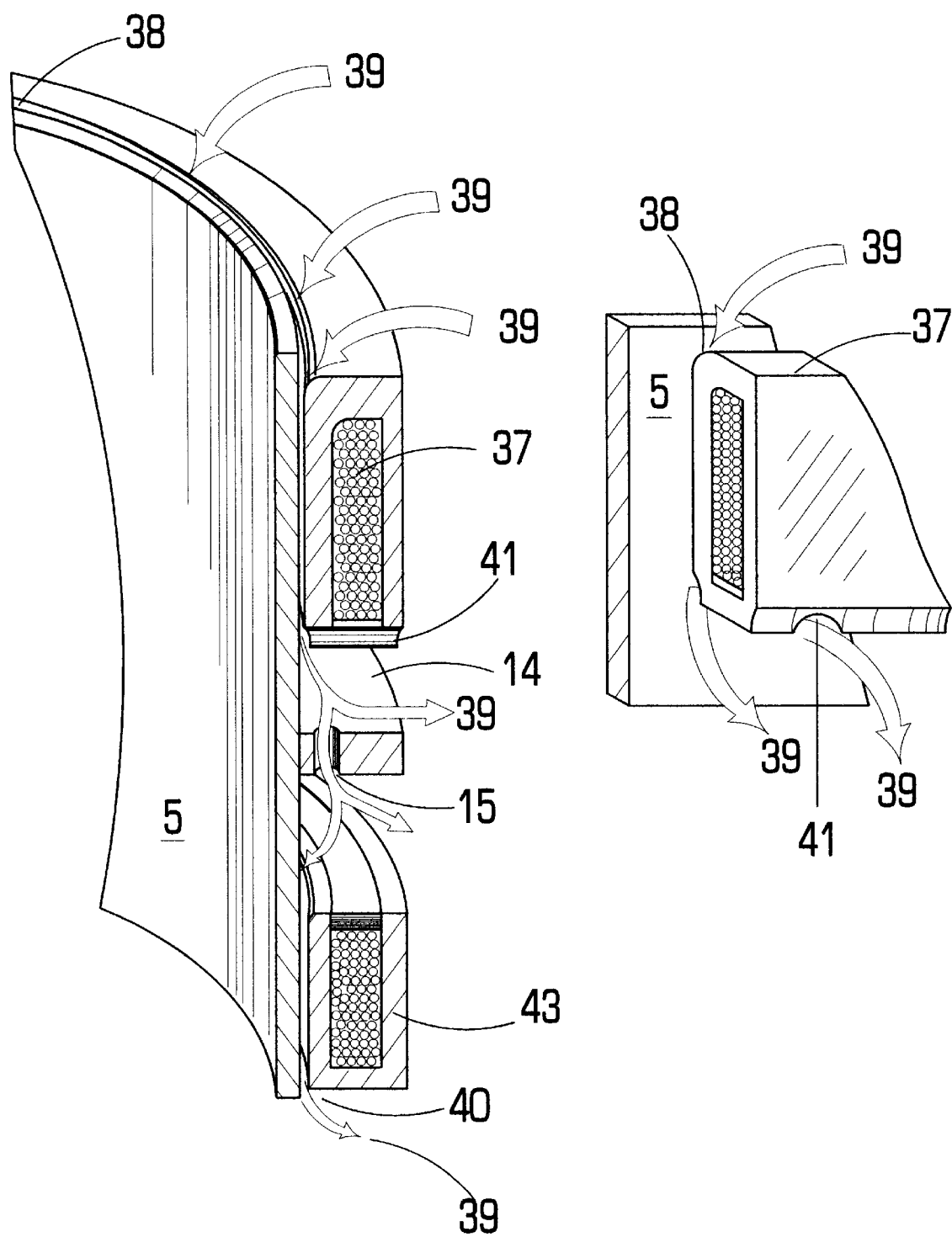
FIG. 3 is an enlarged sectional view of a segment of a cylinder sleeve, its controlling armature and upper and lower solenoid/guides constructed in accordance with an embodiment of the invention showing general oil flow into, through and out of the sleeve valve outer wall area.
Figure 4:
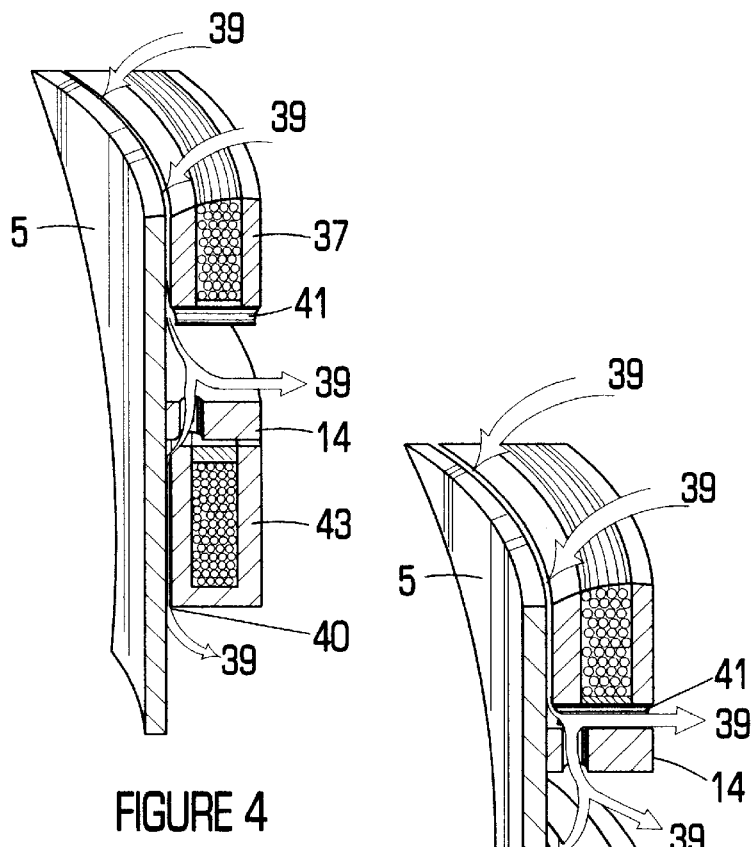
FIG. 4 is an enlarged sectional view of a smaller segment of a cylinder sleeve, its controlling armature and upper and lower combined solenoid/guides of FIG. 3 showing oil flow into, through and out of the sleeve outer wall area when the sleeve valve is at the bottom [valve open] of its travel.
Figure 5:
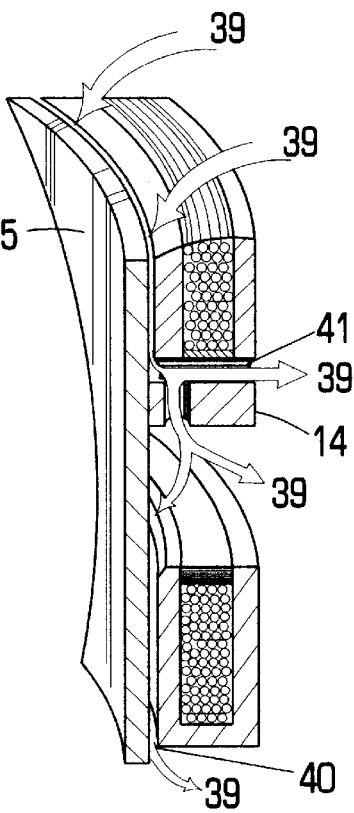
FIG. 5 is an is an enlarged sectional view similar to FIG. 4 except that it depicts oil flow when the sleeve valve is at the top [sleeve valve closed] of its travel.
Figure 6:
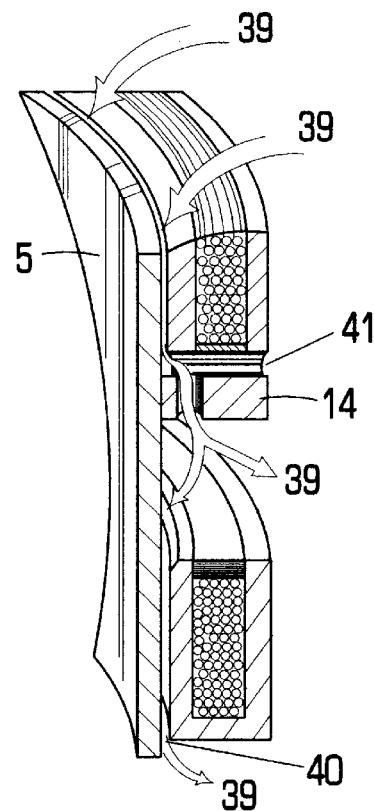
FIG. 6 is an enlarged sectional view similar to FIG. 5 except that it depicts the difference in oil flow when oil normally flowing past the outer periphery of the sleeve valve armature has been cut off by the closing of the sleeve oil control accelerator solenoid.

The cylinder insert FIG. 2 6 is preferably constructed from a heat and wear resistant material. The design of the cylinder insert minimizes impact loads and rapid temperature fluctuations, allowing a wide choice of methods of manufacture, such as casting or sintering and materials to be used. A preferred material would be a ceramic of known type. The cylinder insert preferably incorporates the top of the engine block and its sleeve valve guiding surface with the cylinder head sleeve valve seat thereby insuring long term alignment.

As noted, the at least one poppet valve 52 [FIGS. 1 and 2], located in the cylinder head 11, may be used for exhausting the combustion gases from the engine cylinder and combustion chamber area. While this raises the temperature of the cylinder head and poppet valves compared to the other embodiment of the present invention, the use of an exhaust only poppet valve in the cylinder head gives a benefit of equal and uniform cylinder head temperature over cylinder head design common to the art; that is, no localized areas of dissimilar temperature such as is common where cool intake and hot exhaust ports and valves are closely located in the confined space of a cylinder heads art. It also gives a more desirable temperature gradient to the engine assembly: relatively low in the crankcase area, higher in the cylinder/sleeve upper area, and highest in the cylinder head, giving obvious advantages to the designer. One advantage for the engine designer is the ability to have a split cooling system if so desired; an oil cooled and lubricated lower end with a conventional liquid cooled cylinder head for example. This is shown in FIGS. 1 and 2 indicated generally by 12 and FIGS. 3, 4, 5 and 6. Yet another advantage is the ability to utilize the readily available inert, hot exhaust gases for redundant cylinder warming, charge stratification and/or end gas detonation control. This is especially desirable for six-cycle or skip-cycle engine management strategies.

Oil cooling in the cylinder/sleeve area allows a greatly simplified engine block casting [FIGS. 1, 2, 7 and 22] 1 without the coring required for conventional coolant jackets. Lubricating oil is forced in known manner to the upper, inner regions of the cylinder deck FIG. 1, 38, in proximity of the sleeve area where suitable recesses, guides etc. are provided. After oil has flowed to this upper cylinder block area, it is further directed to flow down the sleeve, FIGS. 3, 4, 5, and 6 removing heat and lubricating the lower sleeve guide area. A sealing ring 9 and oil return passage 7 prevents leakage of engine oil at the cylinder block deck.

Turning again to FIGS. 3, 4, 5 and 6 will give a clear understanding of the cooling and lubricating oil flow in the outer sleeve area. After being pumped to the inner region of the cylinder block deck FIG. 1, 38 oil is forced 39 between the upper solenoid/guide assembly 37 and the sleeve 5 The clearance is small, in the 0.004 to 0.008 inch range to insure good support to the sleeve and a smooth, laminar oil flow to maximize heat exchange into the oil. When oil reaches the sleeve armature 14 it splits, with approximately half continuing between the lower solenoid/guide 43 and the sleeve, to return to the crankcase area. The balance of the cooling oil continues between upper solenoid/guide 37 and armature 14 either through vent holes 41 situated in upper solenoid/guide 37 when the sleeve is closed or in the gap between 14 and 37. After reaching the outside periphery of armature 14 the oil is collected in a circumferential groove [part of block 1] and flows past the normally open sleeve oil control accelerator solenoid 79 thence to return to the crankcase via [FIG. 1] 7.

FIG. 6 shows oil flow when solenoid 79 is closed. When the E.C.U. 77 energizes the sleeve opening solenoid/guide 43 it may also, depending on certain parameters, close solenoid 79 momentarily. The effect of this is to use oil flowing between upper solenoid/guide 37 and sleeve armature 14 to force the sleeve off its seat, assisting the function of sleeve valve opening. After momentarily closing, solenoid 79 is returned to its open position. Note that only a portion of the cooling oil flowing past the outer diameter of the sleeve valve is needed for this function.

The sleeve solenoid/guides 37 and 43 and sleeve armature 14 are preferably made from a durable material with good electromagnetic properties. Such a material is SAE 52100 fully hardened bearing steel. The force exerted by the solenoid/guides is relatively weak, when compared to similar poppet valve solenoids because the sleeve is moved principally through frictional urging, for example of the piston, piston rings, added ferrous inserts or controlled oil injection or the like.

It will be apparent to those skilled in the art that while oil cooling of the cylinder sleeve and use of this lubricant flow to assist in valve position control are advantageously combined they can, of course, be used as completely seperate design features.

It is known that the sliding friction of piston rings on cylinder walls of present combustion engines is one of the major friction loss generators in the engine. Design elements that effect piston to cylinder wall friction include, for example:

1] size of cylinder bore.
2] type, age and number of piston rings
3] offset, if any, between cylinder bore and crankshaft vertical center lines.
4] piston pin bore offset [major thrust side, minor thrust side, or centered]
5] Connecting rod length related to piston stroke, with a relatively shorter connecting rod giving higher piston to cylinder wall thrust. For example, a connecting rod center to center distance less than 1.75 times the piston stroke is a relatively "short" connecting rod.
6] type [if any] of piston skirt shaping, texturing or chemical treatment such as Molybdenum designed to minimize piston skirt to cylinder wall friction.
7] piston to cylinder wall clearance
8] operating and ambient temperature, especially for cold engine starting.
9] relative location of piston pin in relation to piston length.

Figure 9:
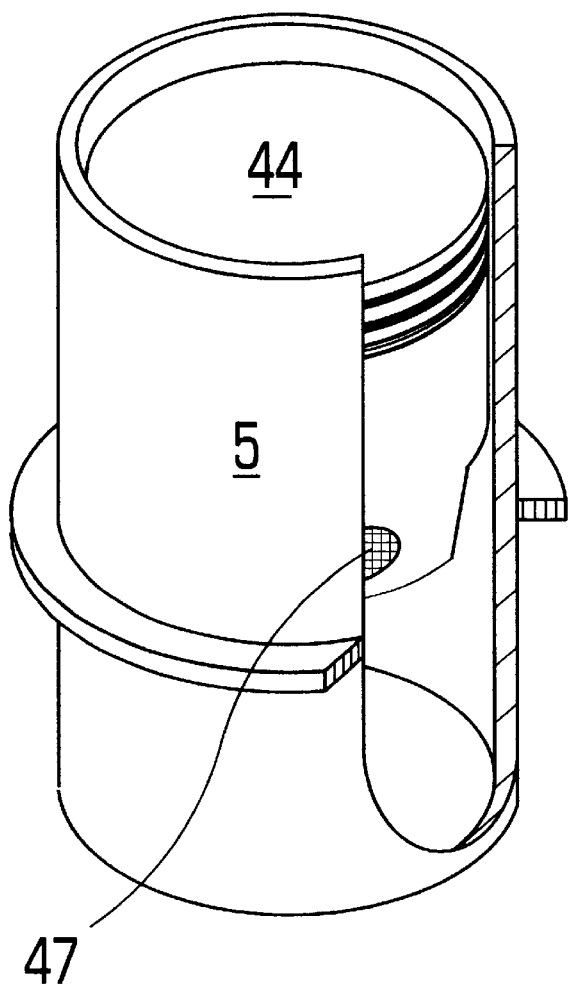
FIG. 9 is a partially cut away perspective view of a sleeve and piston adapted for enhanced sleeve position control by magnetic attraction constructed in accordance with an embodiment of the invention in an operative position.
Figure 10:
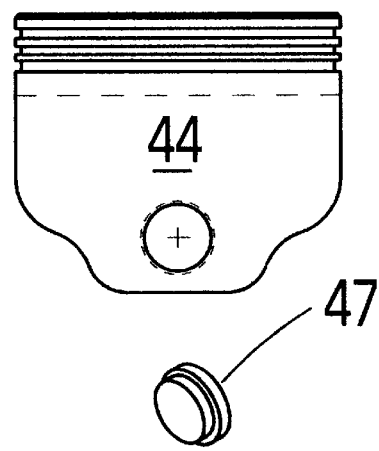
FIG. 10 is an orthogonal side view of a piston and insert adapted for enhanced sleeve position control as shown in FIG. 9.

For these reasons, it is desirable to furnish the engine designer with a variety of piston to sleeve friction controls to ensure desired sleeve movement under all circumstances. The function of a sleeve oil control accelerator solenoid 79 has already been described. Other friction controls include, for example;

1] magnetic attraction of piston rings. As the installed sleeve and piston assembly is essentially an air core solenoid, the ferrous piston rings attempt to turn ninety degrees about their horizontal axis when either solenoid/guide 37 or 43 is energized. This effect is relatively weak but can be increased if desired, for example by integrating a suitably sized capacitor into the control circuits for either solenoid/guide, such that the capacitor discharge powers the solenoid/guide. This is desirable because the discharge voltage of a capacitor is higher than the charging voltage, often some four to six times higher thus the current flow through the solenoid/guide will be both shorter in time and higher in peak amperage thus increasing and focussing magnetic strength. FIGS. 9 and 10 show a piston modified with a ferrous insert to increase piston twist within the sleeve when either solenoid/guide is energized.

Figure 11:
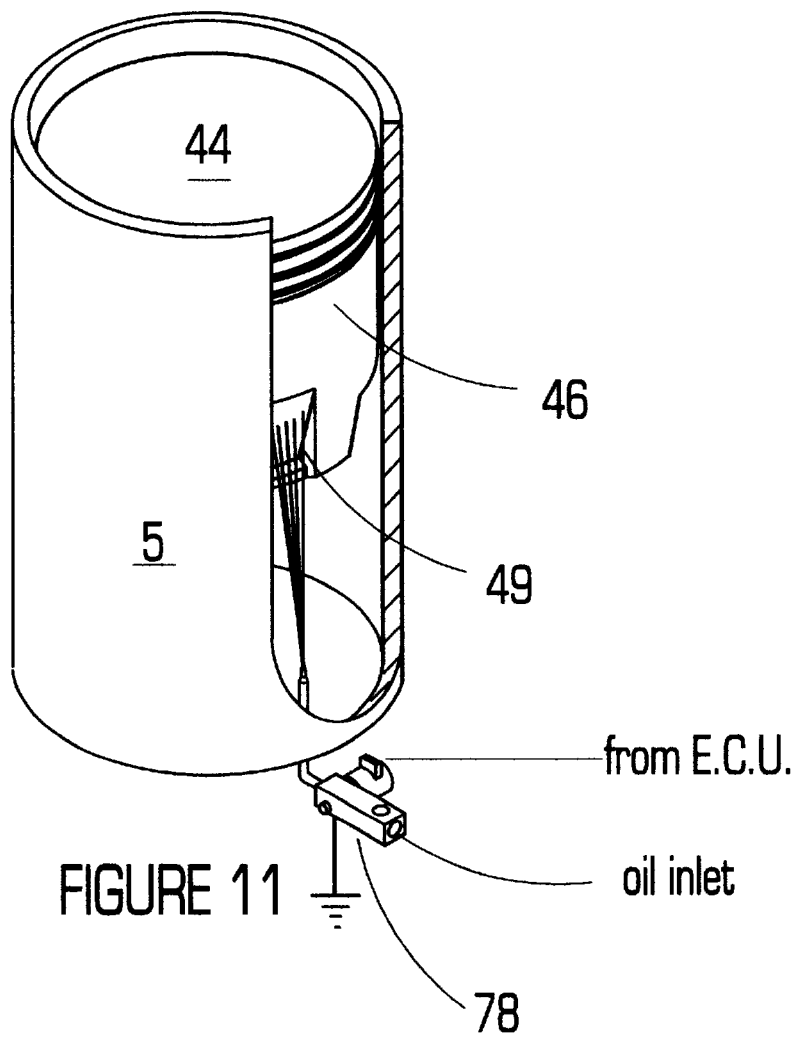
FIG. 11 is a partially cut away perspective view of a cylinder sleeve, modified piston and piston wedgelock oil control solenoid constructed in accordance with an embodiment of the invention in an operative position.
Figure 12:
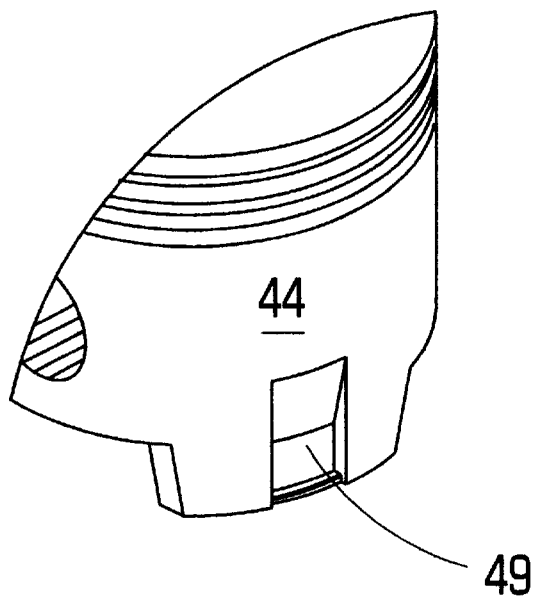
FIG. 12 is a perspective view of a piston segment modified to control frictional characteristics as depicted in FIG. 11.
Figure 13:
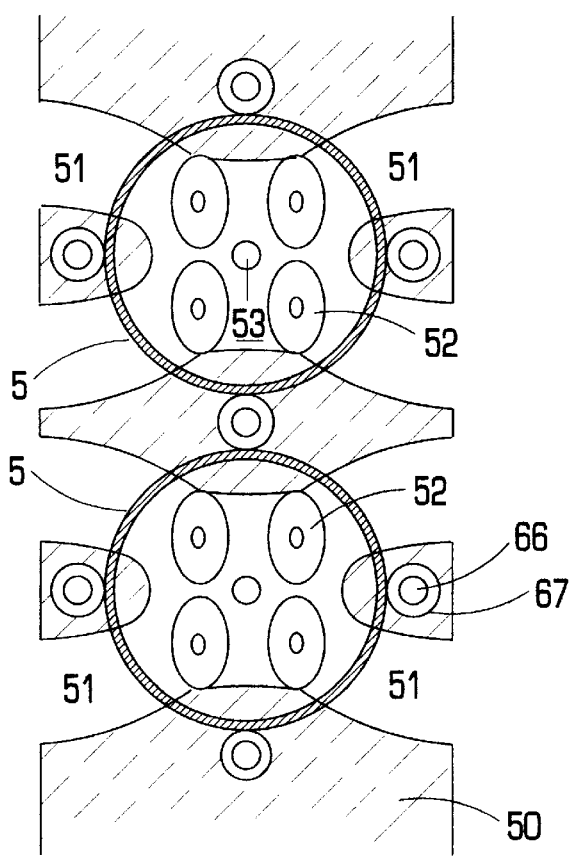
FIG. 13 is a bottom orthogonal view of a cylinder head segment showing two cylinders each with four poppet valves and a sleeve valve. in combination together with swirl guide vanes and their operative attachments constructed in accordance with an embodiment of the invention.
Figure 14:
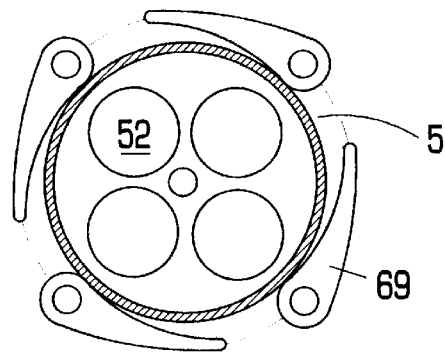
FIG. 14 is a bottom orthogonal view of a cylinder head combustion chamber having four poppet valves and a sleeve valve in combination together with swirl guide vanes in the minimum or closed position.
Figure 15:
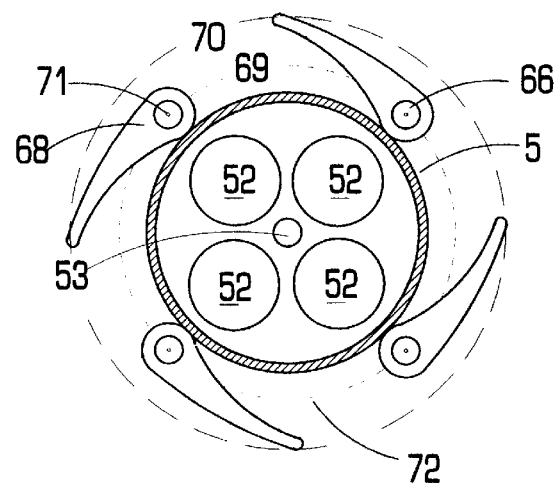
FIG. 15 is a bottom orthogonal view of a cylinder head assembly similar to FIG. 14 except that the swirl guide vanes are in the maximum or wide open position.
Figure 16:
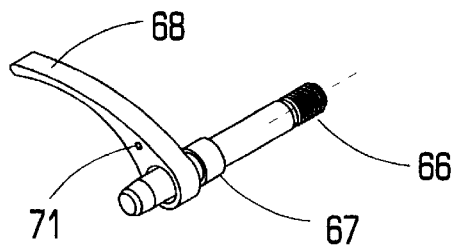
FIG. 16 is a perspective, semi-exploded view of a cylinder head bolt, swirl guide and swirl guide spacer.
Figure 17:
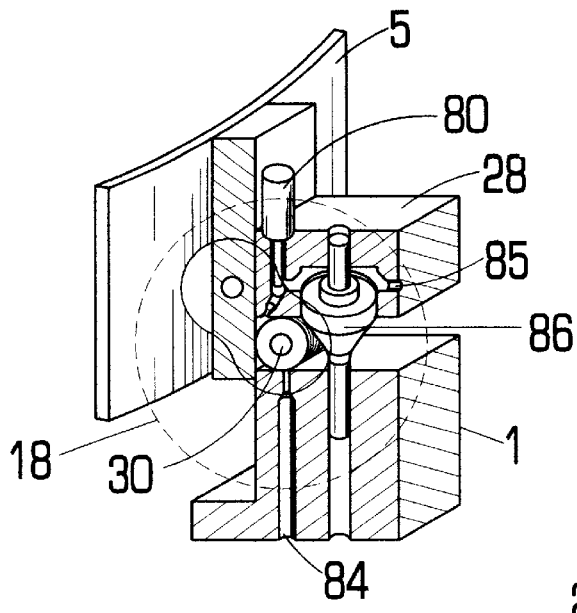
FIG. 17 is a cross-sectional perspective view of an oil controlled sleeve latch assembly constructed in accordance with an embodiment of the invention.
Figure 18:
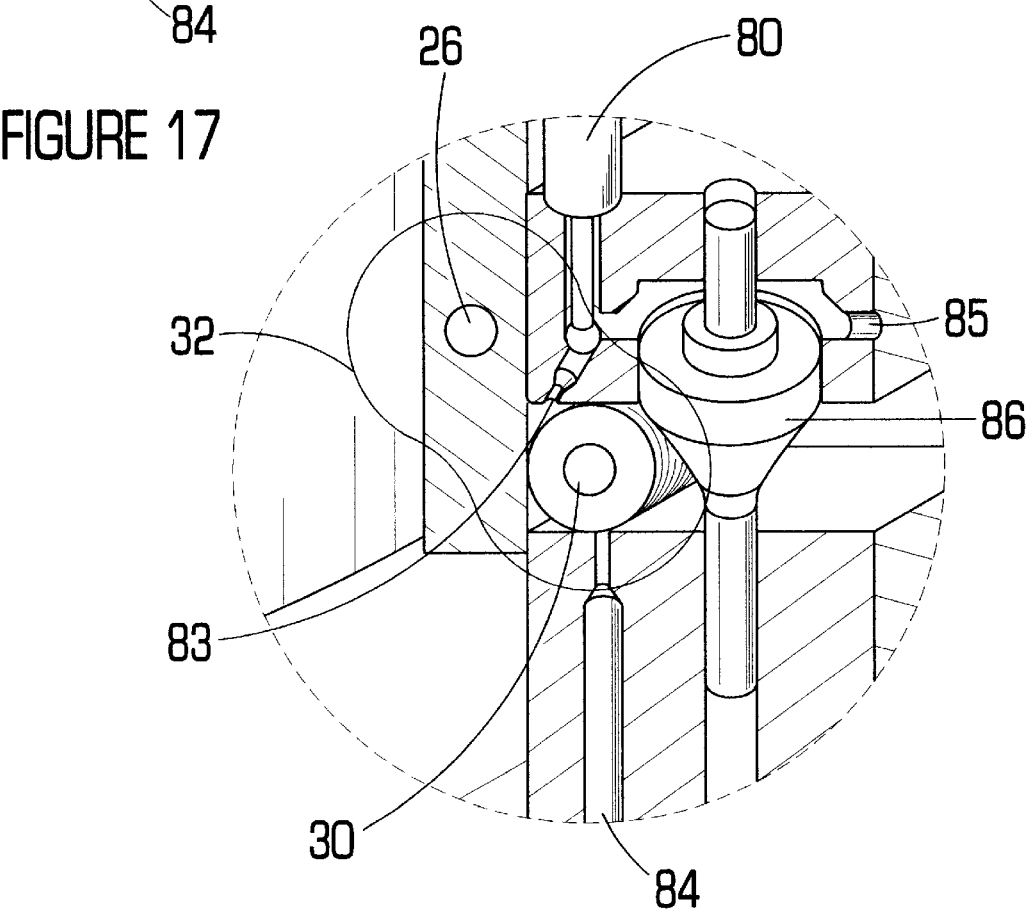
FIG. 18 is an enlarged view of the oil controlled sleeve latch of FIG. 17.
Figure 19:
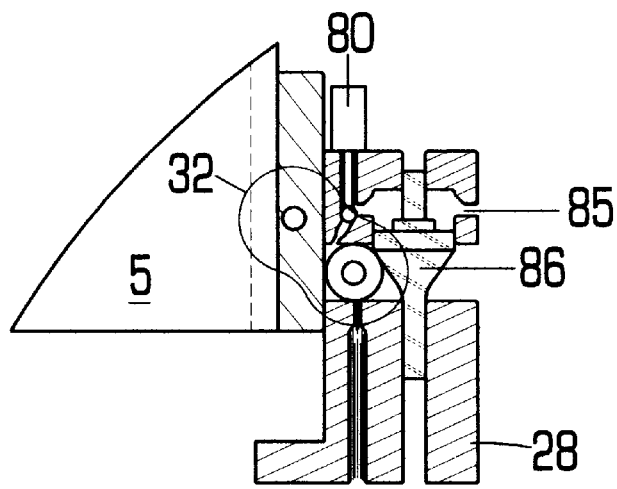
FIG. 19 is a cross-sectional orthogonal view of the oil controlled sleeve latch of FIG. 17 except it is shown locked in the up or sleeve closed position.
Figure 20:
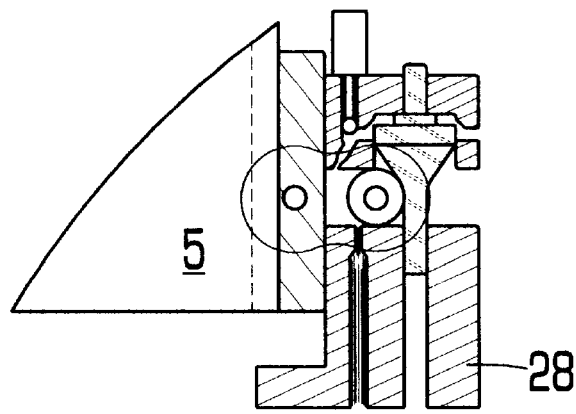
FIG. 20 is a cross-sectional orthogonal view of the oil controlled sleeve latch of FIG. 17 in the mid-travel position.
Figure 21:
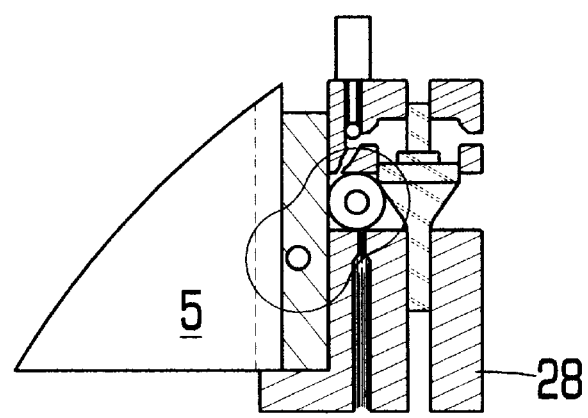
FIG. 21 is a cross-sectional orthogonal view of the oil controlled sleeve latch of FIG. 17 shown locked in the down or sleeve open position.

2] Oil wedging between piston and sleeve. FIGS. 11 and 12 show a piston modified 49 to contain a suitably shaped cavity to form an oil wedge, similar in function to the way a friction bearing and pressurized oil operates. This is also generally shown in FIG. 1 where E.C.U. 77 momentarily energizes piston wedgelock oil control solenoid 78 thus spraying oil into the cavity 49 formed in the piston skirt and partially in the interior wall of the sleeve. Relative motion of the piston combined with a suitable quantity of oil enhances and increases the friction between the piston 44 and cylinder wall or sleeve 5.

3] A mechanical latch is depicted in FIGS. 18 to 21. This can be either passive or active in function. Passive means that it locks or unlocks under control of the E.C.U. 77 through sleeve latch solenoid 80 whereas active means that greater oil pressure is exerted into the cavity formed by sleeve 5, sleeve lock roller 30 and its two guide plates plus engine block 1 which is machined to accurately receive roller 30 as well as solenoid 80, sleeve latch plunger/accumulator 86 and supply and drain lines. Roller 30 and its associated guide plates and sleeve roller pin are very similar to one segment of a common roller chain. This greater oil pressure serves to actually force roller 30 away from sleeve 5 thus pulling sleeve 5 away from its upper or lower position. This oil is exhausted through sleeve latch release oil drain 84 as the roller 30 reaches the mid point FIG. 20 of its travel. This point generally coincides with the mid point of sleeve valve travel.

Solenoid 80 opened to start this process. While solenoid 80 is open, oil pressure drops in the area above sleeve latch plunger/accumulator 86 allowing it to be forced up by oil pressure on roller 30 This has the effect of pumping additional oil through the orifice opened by solenoid 80 further speeding up the movement of roller 30 and the attached sleeve 5.

Closing solenoid 80 cuts off oil pressure to the release side of roller 30 and increases pressure on the top of sleeve latch plunger/accumulator 86, once more forcing it down. This movement forces roller 30 and attached sleeve 5 into either the open FIG. 19 or closed FIG. 21 position, as the case may be.

Figure 8:
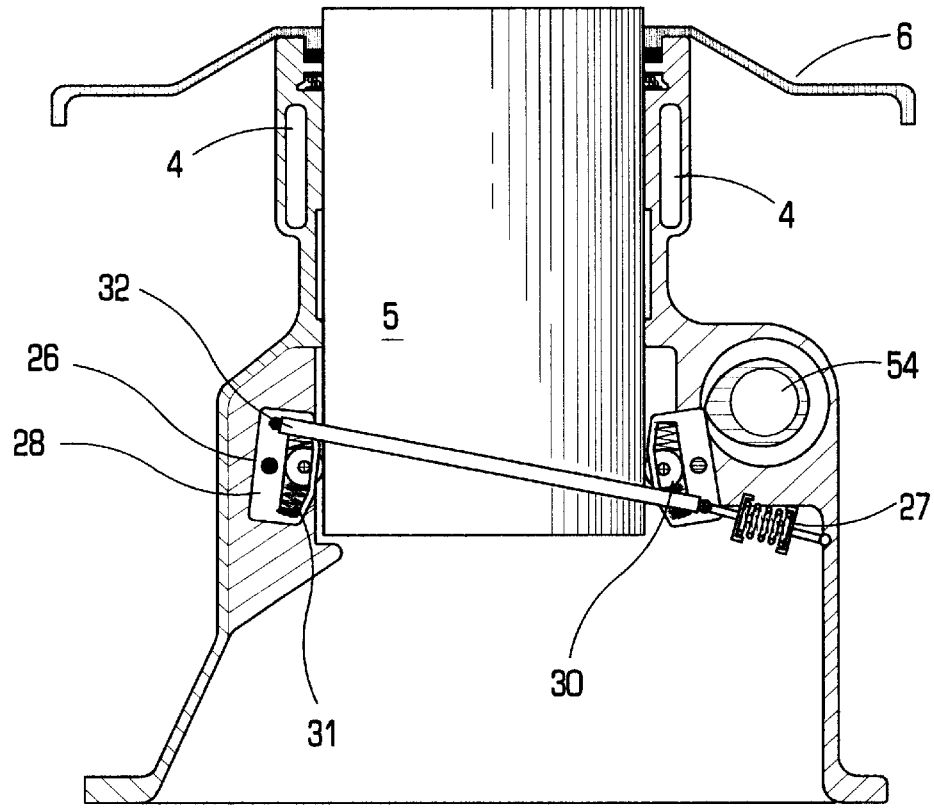
FIG. 8 is a partial cross sectional view of an engine block and sleeve constructed in accordance with an embodiment of the invention depicting a mechanical roller locking sleeve valve latch and alternate design of oil cooled sleeve and a supplementary water cooling jacket.

4] A mechanical roller lock is depicted in FIG. 8. This is essentially two or more reversible roller clutch elements or the like, similar in operation to one way clutches used, for example in automatic transmissions and in industry generally. The roller 30 is locked between the vertical surface of the sleeve 5 and the reversible, suitably angled surface of the sleeve lock block 28. Springs 31 on either side of roller 30 urge it into continuous contact with sleeve 5. The locking roller assemblies are reversed through a simple cam 54 and spring 27 together with an operating link 32 rotating the lock blocks 28 about pivot points 26.

Figure 7:
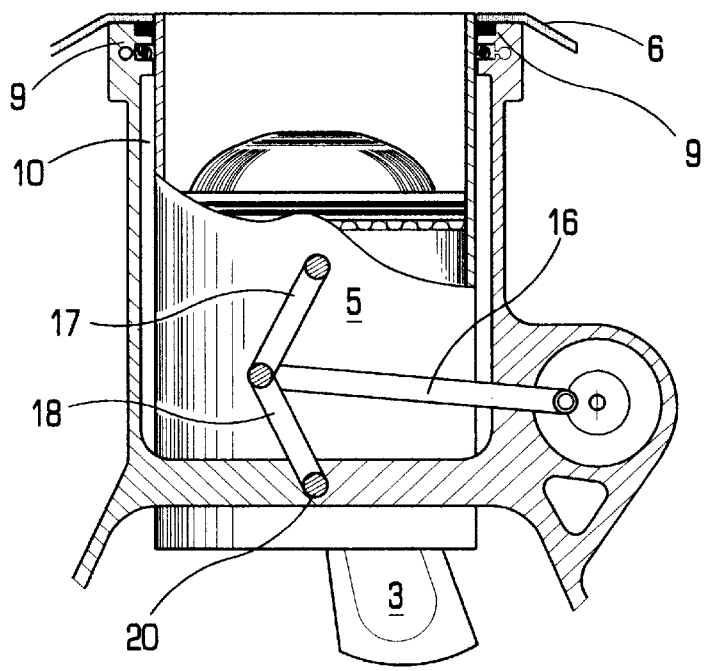
FIG. 7 is a partial cross sectional view of an engine block and sleeve constructed in accordance with an embodiment of the invention depicting a mechanical toggle linkage sleeve valve drive and alternate design of oil cooled sleeve.

5] Toggle linkage, mechanically driven. FIG. 7 illustrates a mechanical drive linkage. Linkage of this type is well adapted to control sleeve movement. By driving the link 16 at half engine speed, a desirable combination of relatively rapid opening and closing together with favorable bottom center and top center dwell periods is achieved. The large mechanical advantage realized at the top of the sleeve stroke assures positive yet smooth sleeve sealing.

Figure 22:
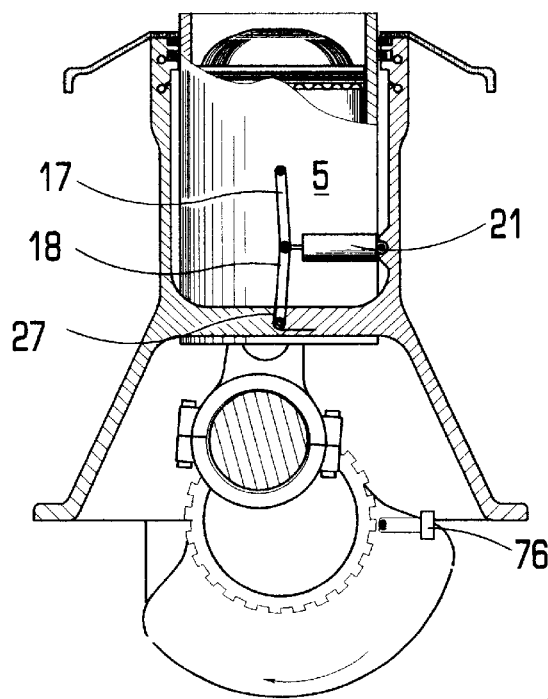
FIG. 22 is a cross-sectional view taken through a single cylinder of a reciprocating internal combustion engine combined with a pictorial view of a solenoid controlled toggle linkage for controlling sleeve valve position, all constructed in accordance with an embodiment of the invention.
Figure 24:
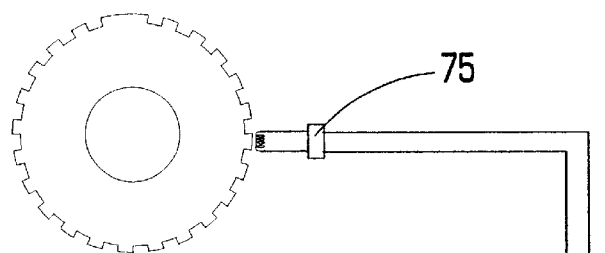
FIG. 24 is a partial view of FIG. 23 showing the control solenoid and toggle linkage in the sleeve valve closed position.
Figure 24:
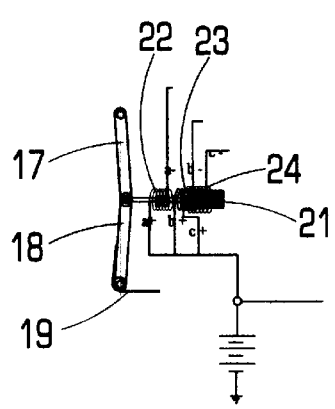
Figure 23:
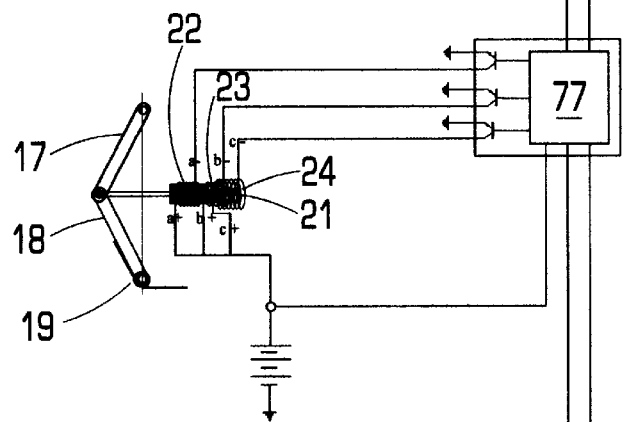
FIG. 23 is a schematic and pictorial view of a computer system to control the sleeve valve of FIG. 22. It depicts the toggle linkage in the sleeve open position.
Figure 23:
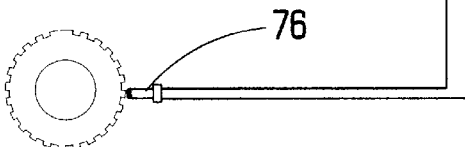

A computer controlled toggle linkage sleeve drive is shown in FIG. 22 together with a pictorial schematic of a computer control circuit in FIGS. 23 and 24. An opening 22 and closing 24 winding power the toggle control solenoid 21 to urge it past either side of the center locking position. An acceleration winding 23 is used to ensure operation at high speed. It is powered by the E.C.U. 77 before 22 or 23 are energized. The solenoid 21 needs to be only powerful enough to urge the toggle linkage past the over center locked position when the sleeve is locked closed or to assist sleeve movement when it is open. Most of the driving force being taken from the piston and associated reciprocating parts, as previously discussed.

OPERATION DETAILED DESCRIPTION

At, or in the vicinity of either Top Dead Center [TDC] or Bottom Dead Center [BDC] the piston in a crank-type engine is moving relatively slowly. A piston in a four cycle engine is at TDC before the start of the intake stroke and at BDC at the start of the exhaust stroke. These are theoretically ideal moments for the intake or exhaust valve events, respectively, to begin. This in fact seldom happens because of the necessity of opening and closing the relatively small poppet valves as soon as possible to maximize inertia effects and minimize stress, wear and noise in the poppet valve gear. Thus, in conventional engines, the exhaust poppet valve, for example begins to open a significant number of degrees before bottom dead center, resulting in a significant loss of available energy of the combusted gases. Similar losses are experienced with intake poppet valves.

However, for sleeve valves engines constructed in accordance with embodiments of this invention it is a practical possibility to open and close the sleeve valve at these ideal times because of the very large valve area compared to any possible form of poppet valve. This does not mean that piston TDC or BDC are the only possible times when a sleeve valve engine constructed in accordance with embodiments of the present invention can open or close said sleeve valve. By utilizing one or more disclosed sleeve control devices a sleeve valve, whether intake or exhaust may be opened or closed at any desired moment in the operating cycle regardless of the relative movement of piston and sleeve.

Operation with sleeve valve as an intake valve

The operation of a four stroke cycle engine of a type constructed in accordance with an embodiment of the present invention wherein the sleeve valve performs the function of an intake valve:

During the compression stroke the two valves 5 and 52 are closed and the piston 44 moves toward the cylinder head 11, thereby compressing the mixture within the combustion chamber 57. As the piston 44 moves upwardly, near the end of the compression stroke, the spark plug [not shown] fires and ignites the combustible mixture in the combustion chamber 57, thereby driving the piston 44 in a downward direction, the valves 5 and 52 remaining closed as is well known in the art.

At the end of the power stroke described, the piston 44 moves upwardly again into the exhaust stroke and substantially at this time the poppet valve actuating mechanism opens the exhaust poppet valve 52.

At the end of the exhaust stroke, the piston 44 approaches Top Dead Center and the intake sleeve valve 5 actuating mechanism of a type constructed in accordance with an embodiment of the invention is actuated in a manner previously detailed permitting the intake sleeve valve to follow the piston after TDC, thus opening. The exhaust poppet valve 52 is closed in known manner as the piston 44 again moves downwardly in the fuel intake stroke. The downward movement of the piston 44 sucks the mixture into the combustion chamber 57 and cylinder through the open intake sleeve valve 5. The intake sleeve valve 5 closes at the end of the intake stroke of the piston 44, using the same methods as outlined to open it and the piston then starts upwardly again in the next compression stroke thereby completing one operating cycle of the engine.

Operation with the sleeve valve as an exhaust valve.

The operation of a four stroke cycle engine of a type constructed in accordance with an embodiment of the present invention wherein the sleeve valve performs the function of an exhaust valve:

During the compression stroke the two valves 5 and 52 are closed and the piston 44 moves toward the cylinder head 11, thereby compressing the mixture within the combustion chamber 57. As the piston 44 moves upwardly, near the end of the compression stroke, the spark plug [not shown] fires and ignites the combustible mixture in the combustion chamber 57, thereby driving the piston 44 in a downward direction, the valves 5 and 52 remaining closed as is well known in the art.

At the beginning of the exhaust stroke, the piston 44 approaches Bottom Dead Center and the exhaust sleeve valve 5 actuating mechanism of a type constructed in accordance with an embodiment of the invention is actuated in a manner previously detailed permitting the exhaust sleeve valve to follow the piston before BDC, thus opening. The exhaust sleeve valve 5 closes at the end of the exhaust stroke of the piston 44, using the same methods as outlined to open it. The intake poppet valve 52 is opened in known manner as the piston 44 again moves downwardly in the fuel intake stroke. The downward movement of the piston 44 sucks the mixture into the combustion chamber 57 and cylinder through the open intake poppet valve 52. At the end of the intake stroke the piston then starts upwardly again in the next compression stroke thereby completing one operating cycle of the engine.

CONCLUSIONS, RAMIFICATIONS, AND SCOPE

Accordingly, it can be seen that what is disclosed are significant advances in the piston engine art. The designer made aware of the embodiments of the invention will have important new tools to construct engines capable of high power output, low emissions and simplified construction.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. An internal combustion engine comprising:
   A cylinder and cylinder block, a cylinder head with combustion chamber, a working piston, a crankshaft, a connecting means rotatably joining said crankshaft and said working piston, wherein said working piston is adapted to reciprocate inside said cylinder along an axis relative to said combustion chamber, the improvement comprising:
   a single sleeve valve of the type controlling flow substantially at its edge, that is its periphery, reciprocatingly mounted in said cylinder block, in combination with at least one poppet valve, reciprocatingly mounted in said cylinder head wherein each said valve directly and individually controls gas flow into or out of said cylinder.

2. The engine as recited in claim number 1, wherein said sleeve valve directly controls air, or a fuel and air mixture flowing into said cylinder and wherein said at least one poppet valve directly controls the flow of exhaust gases out of said cylinder.

3. The engine as recited in claim number 1, wherein said at least one poppet valve directly controls air, or a fuel and air mixture flowing into said cylinder and wherein said sleeve valve directly controls the flow of exhaust gases out of said cylinder.

4. The engine as recited in claim number 1 where a skip-cycle or six-stroke cycle strategy may be used as desired, said cycles may include for example piston strokes of intake, compression, suction, recompression, power, and exhaust, the cycles either intermittently or continually carried out.

5. The engine as recited in claim number 1 wherein said sleeve valve is operatively urged either in whole or in part by thrust transference between said piston, piston rings, connecting rod or attachments thereto and said sleeve valve or attachments thereto either wholly or partially towards the sleeve valve open and sleeve valve closed positions.

6. The engine as recited in claim number 1 wherein said sleeve valve is operatively urged either in whole or in part by friction transference between said piston, piston rings, connecting rod or attachments thereto and said sleeve valve or attachments thereto either wholly or partially towards the sleeve valve open and sleeve valve closed positions.

7. The engine as recited in claim number 1 wherein said sleeve valve is operatively urged either in whole or in part towards the sleeve valve open and sleeve valve closed positions in a controlled and desired manner by magnetic attraction, repulsion, lorentz or similar force between said piston, piston rings, connecting rod or attachments thereto and said sleeve valve or attachments thereto.

8. The engine as recited in claim number 1 wherein said sleeve valve is operatively urged either in whole or in part towards the sleeve valve open and sleeve valve closed positions in a controlled and desired manner by oil or other additive means injected, placed or otherwise introduced between said piston or attachments thereto and said sleeve valve or attachments thereto.

9. The internal combustion engine as recited in claim number 1, wherein means are provided for directing oil to said sleeve valve body in sufficient quantity, shape and form to entirely replace or significantly reduce the vital function of maintaining a desired operating temperature of said sleeve valve and cylinder block heretofor accomplished by conventional water-based cooling systems in this high heat flow location, said oil flow may further be optionally and advantageously used to assist in both the urging force and timing control of the beginning, end and duration of the sleeve valve movement toward the sleeve valve open and sleeve valve closed positions.

10. The engine as recited in claim number 1 wherein said sleeve valve is operatively urged either wholly or in part or held in any desired position by a sleeve lock means or latch means.

11. The engine as recited in claim number 1 wherein said sleeve valve position and movement is controlled, either partially or completely by oil or other additive means operating a locking or urging means such as a piston, latch, orifice or similar means.

12. An internal combustion engine comprising:

A cylinder head with a combustion chamber, a cylinder block, a sleeve valve reciprocatingly mounted in said cylinder block, a crankshaft, a working piston, a connecting means rotatably joining said crankshaft and said working piston, wherein said working piston is adapted to reciprocate inside said sleeve valve along an axis relative to said combustion chamber, the improvement comprising:

said sleeve valve operatively urged in whole or in part by interaction between said reciprocating piston, piston rings, connecting rod or attachments thereto and said reciprocating sleeve valve or attachments thereto either wholly or partially towards the sleeve valve open and closed positions.

13. The engine as recited in claim number 12 where a skip-cycle or six-stroke cycle strategy may be used as desired, said cycles may include for example, piston strokes of intake, compression, suction, recompression, power, and exhaust, said cycles either intermittently or continually carried out.

14. The engine as recited in claim number 12 wherein said sleeve valve is operatively urged either in whole or in part by thrust transference between said piston, piston rings, connecting rod or attachments thereto and said sleeve valve or attachments thereto either wholly or partially towards the sleeve valve open and sleeve valve closed positions.

15. The engine as recited in claim number 12 wherein said sleeve valve is operatively urged either in whole or in part by friction transference between said piston, piston rings, connecting rod or attachments thereto and said sleeve valve or attachments thereto either wholly or partially towards the sleeve valve open and sleeve valve closed positions.

16. The engine as recited in claim number 12 wherein said sleeve valve is operatively urged either in whole or in part towards the sleeve valve open and sleeve valve closed positions in a controlled and desired manner by magnetic attraction, repulsion, lorentz or similar force between said piston, piston rings, connecting rod or attachments thereto and said sleeve valve or attachments thereto.

17. The engine as recited in claim number 12 wherein said sleeve valve is operatively urged either in whole or in part towards the sleeve valve open and sleeve valve closed positions in a controlled and desired manner by magnetic attraction, repulsion, lorentz or similar force between operative elements associated with said cylinder block or attachments thereto and said sleeve valve or attachments thereto.

18. The engine as recited in claim number 12 wherein said sleeve valve is operatively urged either in whole or in part towards the sleeve valve open and sleeve valve closed positions in a controlled and desired manner by oil or other additive means injected, placed or otherwise introduced between said piston or attachments thereto and said sleeve valve or attachments thereto.

19. The internal combustion engine as recited in claim number 12, wherein means are provided for directing oil to said sleeve valve body in sufficient quantity, shape and form to entirely replace or significantly reduce the vital function of maintaining a desired operating temperature of said sleeve valve and cylinder block heretofor accomplished by conventional water-based cooling systems in this high heat flow location, said oil flow may further be optionally and advantageously used to assist in both the urging force and timing control of the beginning, end and duration of the sleeve valve movement toward the sleeve valve open and sleeve valve closed positions.

20. The engine as recited in claim number 12 wherein said sleeve valve is operatively urged either wholly or in part or held in any desired position by a sleeve lock means or latch means.

21. The engine as recited in claim number 12 wherein said sleeve valve position and movement is controlled, either partially or completely by oil or other additive means operating a locking or urging means such as a piston, latch, orifice or similar means.

\* \* \* \* \*